April 8, 1947.   G. A. WALDIE   2,418,532
REMOTE CONTROL
Filed March 10, 1943   2 Sheets-Sheet 1
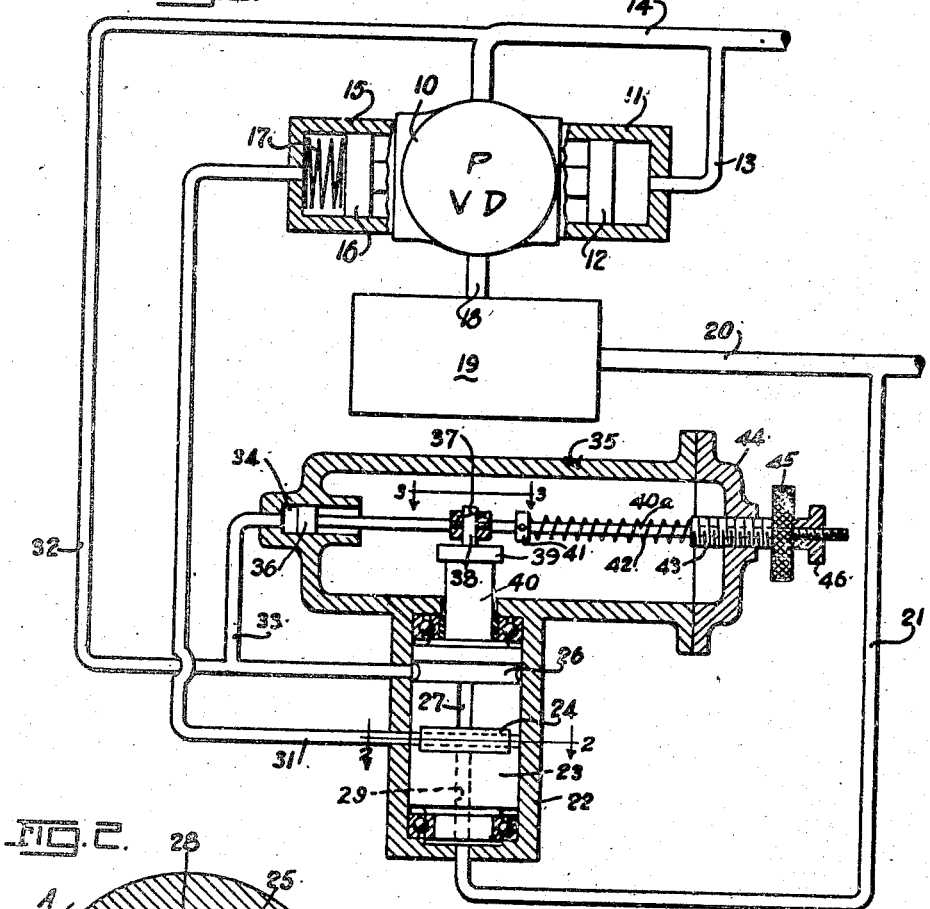
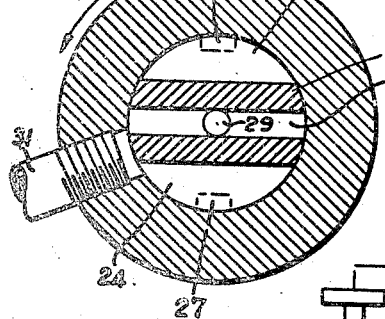
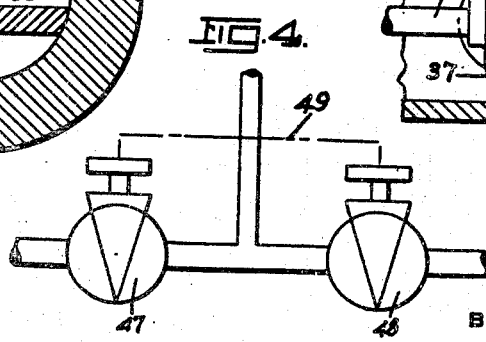
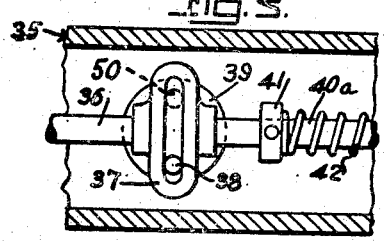
INVENTOR
GEORGE A. WALDIE,
BY
Toulmin & Toulmin
ATTORNEYS Patented Apr. 8, 1947

2,418,532

UNITED STATES PATENT OFFICE 2,418,532

REMOTE CONTROL

George A. Waldie, Edison, Ohio, assignor to The Hydraulic Development Corporation, Inc., Wilmington Del., a corporation of Delaware Application March 10, 1943, Serial No. 478,643

20 Claims. (Cl. 103—38)

This invention relates to control systems and, in particular, to control means for remotely controlling a reciprocable member such as the flow control member of a variable delivery pump.

While heretofore known control systems of this type required mechanical, hydro-mechanical or electrical transmitting means between the control device proper and the member to be controlled, it is an object of this invention to provide a remote control system, in which purely hydraulic means are provided as transmitting means.

It is another object to provide a remote control system for a fluid source of variable delivery including a reciprocable flow control member, in which the pressure for bringing about a movement of the reciprocable control member may be remotely controlled by means connected with said reciprocable member by purely hydraulic means.

Another object of this invention consists in the provision of a remote pressure control system for a pressure fluid source of variable delivery, in which variations in pressure at the delivery side of said fluid source are hydraulically transmitted to a control mechanism which in its turn brings about a variation in the delivery of the fluid source.

It is a still further object of this invention to provide a remote pressure control system for a fluid source of variable delivery, in which mechanically adjustable control means, remotely arranged from said fluid source and connected thereto by hydraulic means only, is adapted automatically to bring about a variation in the delivery of said fluid source in response to a predetermined variation in pressure at the pressure side of said fluid source.

These and other objects and advantages of the invention will appear more clearly from the following specification in connection with the accompanying drawings, in which:

Figure 1 diagrammatically illustrates a first embodiment of a control system according to the present invention.

Figure 2 is an enlarged section along the line 2—2 of Figure 1.

Figure 3 is an enlarged view along the line 3—3 of Figure 1.

Figure 4 is a diagrammatic illustration of the principle of operation of this invention.

Figure 5:
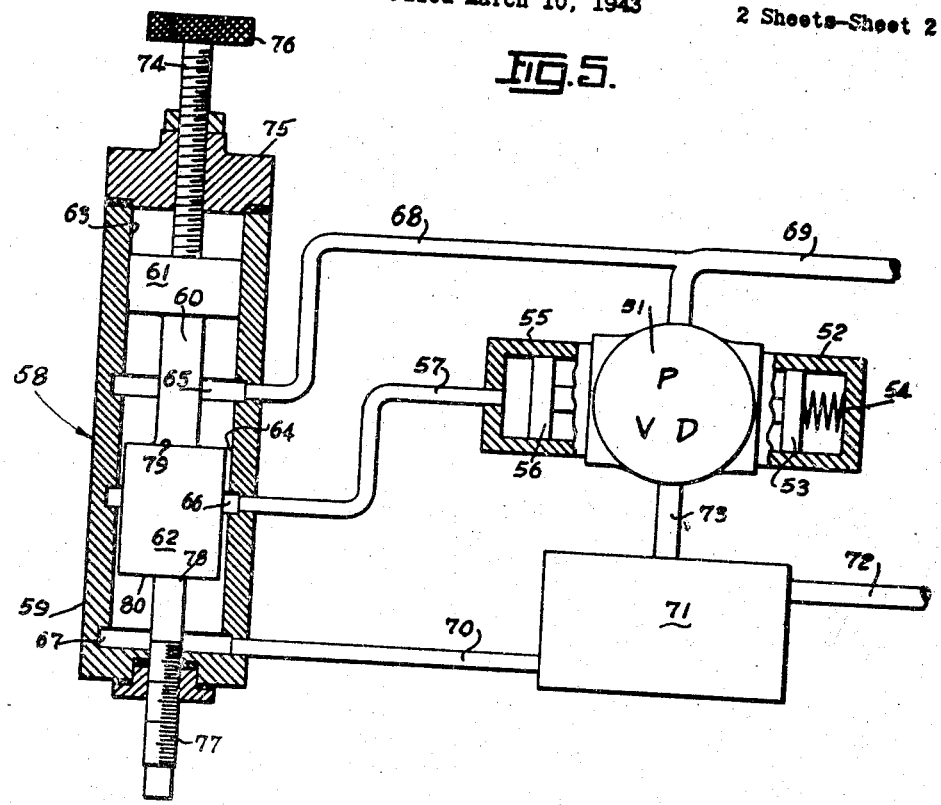

Figure 5 diagrammatically illustrates a control system according to a second embodiment of the invention.

Figure 6:
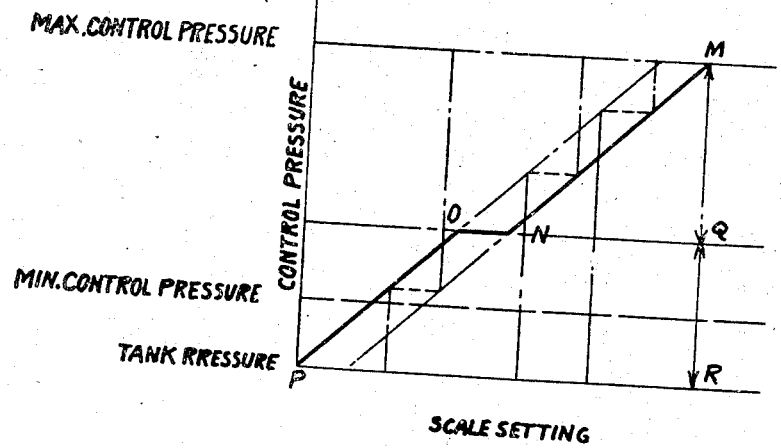

Figure 6 is a graph illustrating the variations of the control pressures.

Referring now to the drawings, and Figures 1 to 3 in particular, the system shown therein comprises a variable delivery pump of any standard design which has connected thereto a casing 11 with a fluid operable plunger 12 reciprocably mounted therein. The plunger 12 is adapted in response to fluid pressure acting thereupon to engage the flow control member of the pump 10 and to actuate the same.

Connected to the casing 11 is a pilot line 13 which leads to the pressure line 14. The pressure line 14 may be connected to the pressure side of a fluid operable motor of any standard design. Also connected to the pump 10 is a control cylinder 15 having reciprocably mounted therein a plunger 16, which latter is continuously urged into engagement with the flow control member of the pump 10 by means of a spring 17. The spring 17 acts through the plunger 16 on the flow control member of the pump 10 so as to continuously urge the pump into full delivery position.

The suction side of the pump 10 is connected through conduit 18 with a fluid reservoir or tank 19. Also connected with the tank 19 is a conduit 20 which may be connected to the exhaust line of the above mentioned fluid operable motor. Connected to the conduit 20 is a line 21 leading to a rotary valve, generally designated 22. This rotary valve comprises a rotary valve member 23 with two oppositely located cut-out portions 24 and 25 which are connected with an annular groove 26 by means of longitudinal grooves 27 and 28, respectively. The valve member 23 has a longitudinal bore 29 therethrough which is in fluid communication with the conduit 21 and also with a passageway 30 in the valve member 23.

The passageway 30 in the valve member 23 communicates through a conduit 31 with the control cylinder 15. The cut-out portions 24 and 25, which are interconnected through the grooves 27 and 28 for balancing the valve member 23, and the passageway 30 are adapted hydraulically to communicate with the conduit 31 leading to the control cylinder 15. The annular groove 26 in the valve member 23 is connected through the conduit 32 with the pressure line 14 and is furthermore connected through a conduit 33 with a cylinder 34 provided in a control device, generally designated 35.

Reciprocably mounted in the cylinder 34 is a plunger 36 which has connected thereto a scotch yoke 37. The yoke 37 engages a pin 38 which is eccentrically connected to a flange 39 on an extension 40 of the valve member 23. It will be clear that movement of the plunger 36 in longitudinal direction will impart a rotative movement to the flange 39 and thereby the rotary valve member 23.

The yoke 37 has connected thereto a rod 40a which has adjustably mounted thereon a collar 41. The collar 41 is engaged by one end of a spring 42, the other end of which engages a screw 43 through which passes the rod 40a. The screw 43 which threadedly engages the closure member 44 of the control device 35 has connected thereto a knurled head 45 which is engaged by an adjustable nut 46 threaded upon the end of the rod 40a. The position of the nut 46 determines the extreme left hand position of the plunger 36.

Before describing the operation of the system shown in Figures 1, 2 and 3, the essence of the invention may be briefly referred to by reference to Figure 4. This figure shows two adjustable chokes 47 and 48 which are interconnected as indicated by the dot-dash line 49. The interconnection is such that if the opening in one choke is increased the opening in the other choke is decreased. It will, therefore, be clear that when the pressure drop across the choke 47 increases, the pressure drop across the choke 48 will decrease.

The opening in the choke 47 corresponds to the free fluid connection between the cut-out portion 24 and the conduit 31, whereas the opening in the choke 48 corresponds to the free fluid connection between the passageway 30 and the conduit 31. The rotation of the valve member 23 from the position shown in Figure 2 in the direction of the arrow A will therefore increase the free fluid connection between the passageway 30 and the conduit 31 while simultaneously restricting the fluid connection between the conduit 31 and the cut-out portion 24.

Referring now again to Figure 1, and assuming that all elements of the hydraulic system occupy the position shown therein, the device operates as follows:

It may be assumed that the pump 10 is delivering pressure fluid into the line 14 from where the fluid passes to the pressure side of a hydraulic motor. The pressure prevailing in conduit 14 is conveyed through conduits 32 and 33 into the cylinder 34 where it acts upon the plunger 36 and moves the same into a position in which the pressure acting upon the plunger 36 is balanced by the spring 42. It may also be assumed that in this balancing position, the valve member 23 occupies the position shown in Figure 2. A portion of the fluid delivered by the pump 10 into the conduit 32 will then pass through the annular groove 26 and the longitudinal groove 27, the cut-out portion 24 and from there in part through conduit 31 into the cylinder 15 where it acts upon the plunger 16.

The fluid pressure thus acting upon the plunger 16 plus the pressure exerted by the spring 17 are balanced by the pressure conveyed from the pressure line 14 through conduit 13 to the plunger 12. Another portion of the fluid in the cut-out portion 24 passes through conduit 31, passageway 30, bore 29 and conduit 21 into the conduit 20.

If now, for some reason, it should occur that the resistance encountered by the said motor increases so that also the pressure in the conduit 14 and therefore also in the conduit 32 increases, this pressure will be conveyed through the conduit 33 to the cylinder 34. Here the pressure will act upon the plunger 36 and move the same toward the right. Due to the connection of the pin 38 with the scotch yoke 37, the rightward movement of the plunger 36 results in a rotative movement of the valve member 23 in the direction of the arrow A.

As a result thereof, the free connection between the cut-out portion 24 and the conduit 31 is reduced whereas the connection between the passageway 30 and the conduit 31 is increased. Consequently, more fluid will escape from cut-out portion 24 and conduit 31 into the passageway 30 and from there into the conduits 21 and 20. This results in a pressure drop in the conduit 31 and therefore also in the cylinder 15. Therefore, the balance of pressure on both sides of the flow control member pertaining to the pump 10 is disturbed in view of the pressure acting on the plunger 12 so that the latter moves the flow control member of the pump 10 to the left as seen in Figure 1 in flow reducing direction against the thrust of the spring 17. If the pressure increase in the conduit 14 and therefore also in the conduit 13 and the casing 11 is sufficiently high, it will move the pump 10 to substantially neutral or no delivery position. When the pressure in the conduit 14 drops again, the pressure in the casing 11 will likewise drop and the spring 17 will again move the flow control member of the pump 10 in flow increasing direction.

To vary the pressure required in the cylinder 34 for bringing about a desired rotation of the valve member 23, it is merely necessary to adjust the screw 43, thereby varying the thrust of the spring 42. The starting position from which the valve member 23 will rotate may be varied by varying the position of the nut 46.

While the system shown in Figure 1 has been described as a pressure control system, the arrangement of Figure 1 may also be used for overcoming temporarily increased resistance as it is sometimes encountered with machine tools. To make the system of Figure 1 adaptable for this purpose, it is merely necessary to eliminate the pin 38 and substitute therefor the pin 50 indicated in dot-dash lines. It will then be clear that when the pressure in the conduit 14 due to increased resistance should increase, this pressure will act through conduits 32 and 33 on the plunger 36 and move the same toward the right to bring about rotation of the valve member 23 in clockwise direction with regard to Figure 2. This will increase the fluid connection between the cut-out portion 24 and conduit 31, while decreasing the fluid connection between the conduit 31 and the passageway 30.

Therefore, the pressure in conduit 31 will increase and move the pump 10 in delivery increasing direction. Consequently, a greater quantity of fluid will be delivered by the pump 10 into the conduit 14 which will be adapted to meet the increased resistance. When the resistance has been overcome, the pressure in conduit 14 will drop again so that also the pressure in the cylinder 34 will decrease and the spring 42 will move the valve member 23 in anti-clockwise direction. This will restore the original conditions.

It should be noted that in the operation just described, the increase in pressure in the cylinder 15 due to the rotation of the valve member 23 in clockwise direction will be higher than the increase in pressure in the casing 11. This is due to the ratio of transmission between the plunger 36 and the valve member 23.

Referring now to Figure 5, the system shown therein makes use of the same principle described in connection with Figures 1 to 3. According to Figure 5, a pressure fluid source of variable delivery such as the pump 51 is provided. The pump 51 has connected thereto a control cylinder 52 with a plunger 53 reciprocably mounted therein. The plunger 53 is acted upon by a spring 54 which continuously urges the pump 51 into full stroke position.

The pump 51 has also connected thereto a control cylinder 55 in which is reciprocably mounted a plunger 56 adapted in response to a predetermined pressure acting thereupon to move the pump 51 into flow reducing direction against the thrust of the spring 54. Connected to the cylinder 55 is a conduit 57 which leads to a control device, generally designated 58.

The device 58 comprises a cylinder 59 closed at each end and having reciprocably mounted therein a valve member, generally designated 60. The valve member 60 includes two spaced pistons 61 and 62 reciprocably mounted in a bore 63. While the outer diameter of the piston 61 corresponds substantially to the inner diameter of the bore 63, the piston 62 has a smaller diameter so that a cylindrical space 64 is formed between the piston 62 and the adjacent portion of the bore 63 adapted to allow fluid communication between the bore portion located intermediate the pistons 61 and 62 with that portion of the bore 63 which is located between the lower end of the bore 63 and the piston 62.

The cylinder 59 is provided with three spaced annular grooves 65, 66 and 67. The annular groove 65 is connected through a conduit 68 with the pressure line 69 interconnecting the pressure side of the pump 51 with the pressure side of a hydraulically operable motor not shown. The groove 66 communicates through the conduit 57 with the cylinder 55, while the groove 67 is connected through a conduit 70 with the tank or fluid reservoir 71. The tank 71 is connected through a line 72 with the exhaust port of the above mentioned fluid operable motor.

The tank 71 is furthermore connected with the suction side of the pump 51 through a conduit 73. The valve member 60 is also provided with a threaded extension 74 which threadedly engages the closure member 75 of the cylinder 59 and is adjustable from the outside of the cylinder 59 so as to selectively move the valve member 60 upwardly or downwardly.

The extension to which the valve member 60 is moved upwardly or downwardly by rotation of the knurled head 76 can be checked on the scale 77 provided on an extension 78 of the valve member 60 which scale extends to the outside of the cylinder 59.

The device of Figure 5 operates as follows:

It may be assumed that the pump 51 has been shifted into full stroke position by the spring 54 and now begins to deliver pressure fluid into the pressure line 69. Soon pressure begins to develop in the line 69 which pressure is conveyed through conduit 68 to the bore 63. Here the pressure fluid passes through the cylindrical portion 64 between the upper surface 79 of the piston 62 and the annular groove 66.

When this fluid enters the conduit 57, a predetermined pressure drop will have taken place. However, pressure still prevails in the conduit 57 which pressure will act upon the plunger 56 and counteract the spring 54 to thereby bring about reduction of the delivery of the pump 51.

If the pressure acting upon the plunger 56 is sufficiently high, the pump 51 will be moved to substantially neutral or no delivery position. The pressure which will act upon the plunger 56 will be dependent on the pressure drop between the upper surface 79 of the piston 62 and the annular groove 66. Therefore, changing the distance between the surface 79 and the groove 66, by rotating the head 76 will vary the pressure required for moving the plunger 56 in flow restricting direction.

The result of the adjustment of the valve member 60 can be read from the graph in Figure 6. In this figure, the ordinate indicates the control pressure, i. e., the total pressure drop from the surface 79 to the surface 80, whereas the abscissa indicates the setting of the scale 77.

The particular control position shown in Figure 5 is illustrated in Figure 6 by the curve MNOP. The line ON indicates the place of the annular groove 66 with respect to the upper and lower surfaces 79 and 80, respectively, of the valve member 62. It will, therefore, be clear that in the graph of Figure 6, MQ indicates the pressure drop between the surface 79 and the annular groove 66, whereas the line QR indicates the pressure drop between the annular groove 66 and the surface 80.

The graph of Figure 6 therefore, makes it possible to find the pressure drop between the surface 79 and the groove 66 and also between the groove 66 and the surface 80 for any desired position of the valve member 60, thereby enabling a proper gaging of the scale 77.

It is, of course, understood that the present invention is by no means limited to the particular structure shown in the drawings but embraces any modifications which come within the scope of the appended claims.

Having thus fully described my invention, what I claim as new and desire to secure by Letters Patent is:

1. In combination, a variable delivery pump having control means for varying the delivery, yielding means for continuously urging said control means in delivery increasing direction, fluid operable plunger means likewise associated with said pump control means and operable thereon selectively to move said means to vary the delivery of the pump, and choke means hydraulically connected between the delivery side of said pump and said plunger means and adapted in response to a predetermined pressure at the delivery side of said pump to cause said plunger means to reduce the delivery of said pump.

2. In combination, a fluid source of variable delivery, delivery varying means associated with said fluid source for selectively increasing or reducing the delivery thereof, yielding means associated with said delivery varying means and continuously tending to increase the delivery of said source, and choke means connected to said delivery varying means by hydraulic means only, said choke means being responsive to pressure at the delivery side of said fluid source to cause said delivery varying means to reduce the delivery of said fluid source at a predetermined pressure depending on the setting of said choke means.

3. In combination, a variable delivery pump, means continuously urging said pump into full delivery position, a first and an opposed second plunger of substantially equal areas, said first plunger being directly connected with the pressure side of said pump and being adapted to reduce the delivery of said pump against the thrust of said urging means, pressure responsive choke means hydraulically connected with the second plunger, and fluid pressure responsive means hydraulically connected with the delivery side of said pump for adjusting said choke means in response to a predetermined pressure at the delivery side of said fluid source to thereby reduce the pressure on said second plunger, thereby causing said first plunger to reduce the delivery of said fluid pump.

4. In combination, a variable delivery pump, means for continuously urging the delivery control of said pump into full delivery position, a first and an opposed second plunger of substantially equal areas, said first plunger being directly connected with the pressure side of said pump and being adapted to reduce the delivery of said pump against the thrust of said urging means, fluid pressure responsive choke means hydraulically connected between the second plunger and the delivery side of said pump, and means for adjusting the actuating pressure for said fluid pressure responsive means.

5. In combination, a variable delivery pump, resilient means for continuously urging the delivery control of said pump into full delivery position, plunger means operatively connected with the delivery control of said pump and adapted selectively to reduce the delivery of said pump against the thrust of said resilient means, and choke means having one side thereof connected with the delivery side of said pump and having another side connected with said plunger means to thereby cause the latter in response to a predetermined pressure at the delivery side of said pump to reduce the delivery thereof.

6. In combination, a pump of variable delivery, yielding means for continuously urging the delivery control of said pump into full delivery position, plunger means operable by pressure fluid and associated with the control means of said pump for reducing the delivery of said pump in response to a predetermined pressure on said plunger means, pressure control means including a cylinder hydraulically connected with the delivery side of said pump, and a control piston adjustable in said cylinder and having an outer diameter less than the inner diameter of said cylinder so as to create a pressure drop between the ends of said piston, and means hydraulically connecting a point between the ends of said piston with said plunger means.

7. In combination, a pump of variable delivery, yielding means for continuously urging the delivery control of said pump into full delivery position, plunger means operable by pressure fluid and associated with the control means of said pump for reducing the delivery of said pump in response to a predetermined pressure on said plunger means, pressure control means including a cylinder hydraulically connected with the delivery side of said pump, and a control piston adjustable in said cylinder and having an outer diameter less than the inner diameter of said cylinder so as to create a pressure drop between the ends of said piston, means for hydraulically connecting a point between the ends of said piston with said plunger means, and means for adjusting said piston to vary the position of said point.

8. In combination, a variable delivery pump, means continuously urging said pump into full delivery position, pressure-actuated plunger means having a first and a second opposed area for controlling the delivery of said pump, said first area being directly connected with the delivery side of said pump, pressure-actuated choke means hydraulically connected with said second area, and fluid pressure responsive means hydraulically connected with the delivery side of said pump and connected to vary the choke setting in response to a predetermined pressure at the delivery side of said pump.

9. In combination, a fluid source having variable delivery control means, yielding means urging said control means to full delivery position, pressure responsive means coacting with said yielding means to vary the delivery of said source, and a connection between the output of said source and said responsive means, including means of applying to said responsive means a pressure which is a predetermined fractional part of the pressure of said output.

10. In combination, a source of fluid having variable delivery control means, means continuously urging said control means toward full delivery position, pressure responsive plunger means connected to be actuated by pressure from said fluid source and operable to vary the effect of said urging means to thus vary the delivery of said fluid source, pressure responsive choke means hydraulically connected to influence said plunger means, said choke means being hydraulically connected to and actuated by pressure changes in the delivery side of said fluid source to thereby responsively alter the pressure acting upon said plunger means and thereby cause a reduction in delivery of said fluid source.

11. In combination, a fluid source of variable delivery, means controlling the delivery of said source, means urging said controlling means into full delivery position, means responsive to delivery pressure of said source and operable on said controlling means against the action of said urging means to effect a change in the delivery of said source, and means connected to be responsive to the delivery pressure of said source to establish a control pressure which is a predetermined fractional part of said delivery pressure, and a fluid connection connecting said control pressure and said delivery controlling means to supplement the action of said urging means.

12. In combination, a fluid source having delivery control means, pressure responsive means operable on said control means to vary the delivery of said source, a flow restrictor connected to pass fluid from the discharge side of said source, and means hydraulically connecting said pressure responsive means with said flow restrictor between the inlet and outlet thereof for receiving pressure therefrom.

13. In combination, a fluid source having delivery control means, yielding means continuously urging said control means toward full delivery position, pressure responsive means operable on said control means to vary the delivery of said source, a flow restrictor having its inlet connected to the discharge side of said source to pass fluid therefrom to its outlet, and means hydraulically connecting said pressure responsive means with said flow restrictor between the inlet and outlet thereof for receiving pressure therefrom which is a predetermined fraction of the discharge pressure of said source.

14. In combination, a fluid source having delivery control means, pressure responsive means operable on said control means to vary the delivery of said source, a flow restrictor having its inlet connected to the discharge side of said source to pass fluid therefrom to its outlet, means hydraulically connecting said pressure responsive means with said flow restrictor between the inlet and outlet thereof, and means for adjusting the effective hydraulic position of said last mentioned connection between the said flow restrictor inlet and outlet.

15. In combination, a fluid source having delivery control means, fluid pressure responsive means operable on said control means to vary the delivery of said source, first and second flow restricting means serially connected between the discharge side of said source and a point of lower pressure to pass fluid from said discharge, and means hydraulically connecting said pressure responsive means to be actuated in response to the pressure between said restricting means.

16. In combination, a fluid source having delivery control means, fluid pressure responsive means operable on said control means to vary the delivery of said source, first and second flow restricting means serially connected between the discharge side of said source and a point of lower pressure to pass fluid from said discharge, and means for adjusting at least one of said restricting means to vary the pressure which actuates said pressure responsive means.

17. In combination, a fluid source having delivery control means, fluid pressure responsive means operable on said control means to vary the delivery of said source, first and second flow restricting means serially connected between the discharge side of said source and a point of lower pressure to pass fluid from said discharge, and means operable simultaneously to adjust both of said restricting means to vary the pressure therebetween and thereby to vary the pressure to which said pressure responsive means is responsive.

18. In combination, a fluid source having delivery control means, fluid pressure responsive means operable on said control means to vary the delivery of said source, first and second flow restricting means serially connected between the discharge side of said source and a point of lower pressure to pass fluid from said discharge, and means operable inversely and simultaneously to adjust said restricting means for varying the pressure therebetween and thus to vary the discharge pressure of the source which is effective to actuate said pressure responsive means.

19. In combination, a fluid source, delivery control means associated with said source, pressure responsive means operable on said control means to vary the delivery of said source, flow restricting means connected between the discharge side of said source and the exhaust to pass fluid from said discharge, means hydraulically connecting said pressure responsive means with a point on said flow restrictor between the inlet and outlet thereof, and fluid pressure responsive means connected to be responsive to the discharge pressure of said source and operable automatically for varying the effective hydraulic position of the connection of said pressure responsive means with said flow restrictor.

20. In combination, a fluid source having delivery control means, pressure responsive means operable on said control means to vary the delivery of said source, a first and a second flow restricting means connected to pass fluid from the discharge side of said source in proportion to the pressure thereof, conduit means hydraulically connecting said pressure responsive means to be actuated in response to the pressure between said restricting means, and means connected with the discharge side of said source and responsive to the pressure thereof for simultaneously adjusting said flow restricting means one in the increasing direction and one in the decreasing direction to vary the actuating pressure for said pressure responsive means.

GEORGE A. WALDIE.

REFERENCES CITED

The following references are of record in the file of this patent:

UNITED STATES PATENTS

| Number | Name | Date |
|---|---|---|
| 1,908,534 | Parsons | May 9, 1933 |
| 2,032,430 | Muller | Mar. 3, 1936 |
| 2,248,076 | Harrington | July 8, 1941 |
| 2,238,063 | Kendrick | Apr. 15, 1941 |
| 2,238,061 | Kendrick | Apr. 15, 1941 |
| 1,870,501 | Ernst | Aug. 9, 1932 |
| 2,333,530 | Ernst | Nov. 2, 1943 |